Figure 1:
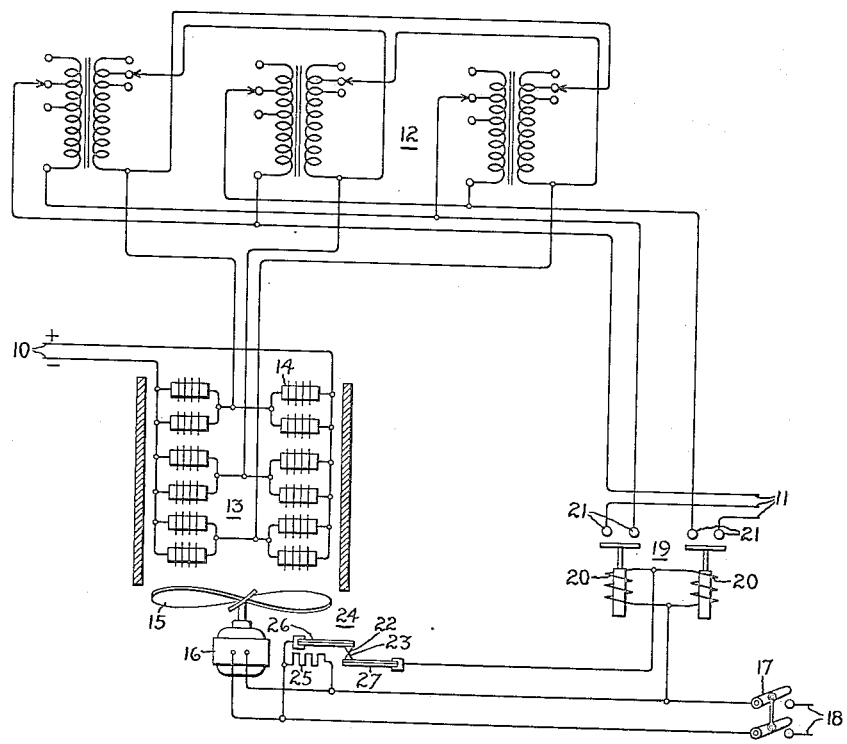

July 26, 1938.                E. A. HARTY                  2,125,110
           PROTECTIVE MEANS FOR FAN COOLED RECTIFIERS AND THE LIKE
                     Filed March 10, 1936        3 Sheets-Sheet 1

Inventor:
Edgar A. Harty,
by Harry E. Dunham
His Attorney.

July 26, 1938.    E. A. HARTY    2,125,110
PROTECTIVE MEANS FOR FAN COOLED RECTIFIERS AND THE LIKE
Filed March 10, 1936    3 Sheets-Sheet 2

Inventor:
Edgar A. Harty,
by Harry E. Dunham
His Attorney.

July 26, 1938.　　　　　E. A. HARTY　　　　　2,125,110
PROTECTIVE MEANS FOR FAN COOLED RECTIFIERS AND THE LIKE
Filed March 10, 1936　　　3 Sheets-Sheet 3

Inventor:
Edgar A. Harty
by Harry E. Dunham
His Attorney.

Patented July 26, 1938

2,125,110

UNITED STATES PATENT OFFICE 2,125,110

PROTECTIVE MEANS FOR FAN COOLED RECTIFIERS AND THE LIKE

Edgar A. Harty, Marblehead, Mass., assignor to General Electric Company, a corporation of New York Application March 10, 1936, Serial No. 68,061

11 Claims. (Cl. 171—314)

My invention relates to apparatus which requires in its operation a current of cooling medium to remove heat losses and which is subject to damage due to overheating in the event of the stoppage of the current of cooling medium. The invention relates more particularly to rectifier apparatus including rectifier devices of the contact type arranged for relatively large power output and in which a rise in operating temperature above a predetermined safe limit is prevented by a blower means.

Rectifying apparatus is commonly employed to supply direct current from alternating current power lines for arc lamps of motion picture projectors and for charging storage batteries. For these and similar uses fan cooled contact rectifiers of the copper oxide type, as described for example in Amsden Patent 1,947,240, assigned to the same assignee as the present application, are eminently suitable by reason of their simplicity, compactness, reliability in operation, and long life.

The copper oxide rectifier, however, is a device which is injured if the temperature therein is permitted to rise more than a predetermined number of degrees, and difficulties have been encountered in the use of apparatus employing contact rectifier devices due to the disablement or stoppage of the blower means supplying the cooling air for the rectifier devices with consequent destructive rise of the rectifier temperature.

It has been proposed heretofore to protect rectifiers and like devices from injury due to overheating upon stoppage of the blower means by the provision, for example, of usual thermostatic protective devices designed to be operated directly in response to the temperature rise in the rectifier device, but such means has not proved in practice effective to forestall without fail dangerous overheating sufficient at times to destroy the rectifier unit, which then requires replacement at considerable cost.

In other types of apparatus also, such as electric current transformers, wherein operating conditions and requirements have been such that a dangerous or destructive overheating of the apparatus resulted upon disablement or stoppage of the air blast or other current of cooling medium, the provision of the usual thermostatic protective means responsive only to the dangerous rise in temperature of the apparatus itself has in certain cases proved inadequate.

It is an object of my invention to prevent damage from overheating in apparatus cooled by a current of cooling medium to remove the heat losses, by protective means responsive directly to the current of cooling medium, whereby during normal operation of the cooling device the operation of the apparatus is permitted to continue, but upon occurrence of impairment or stoppage of the cooling current the development of heat losses is stopped or the operation of the apparatus is discontinued.

A further object is to prevent damage from overheating in apparatus cooled by a blower means providing an air blast, by protective means arranged to operate in response to the air blast.

A particular object is to prevent overheating of a rectifier device cooled by an air blast, by thermostatic switch means arranged to operate in response to the air blast.

Another object is to prevent overheating of a blower cooled rectifier apparatus for supplying direct current to a load such as a motion picture arc from an alternating current circuit, by means including a control circuit and a thermostatic means energized from the control circuit and arranged to control the operation of the rectifier apparatus in response to the air blast from the blower.

A further object is to prevent overheating of a blower cooled rectifier apparatus for supplying charging current to a storage battery from an alternating current circuit, to prevent operation of the rectifier unless the storage batteries are connected for charging, and to prevent the rectifier from being connected to the battery in case the alternating current circuit fails, by means including a thermostatic switch means operating in response to the air blast from the blower.

A further object is to prevent overheating of a blower cooled transformer apparatus, by means including a thermostatic switch means operating in response to an air blast from the blower.

In accordance with my invention the foregoing objects, and other objects and advantages which will hereinafter appear, are obtained by the provision, in the rectifier or other apparatus subject to overheating upon disablement of a blower or other means for supplying a current of cooling medium, of a protective means normally continuously so energized that the operation of the rectifier or other apparatus would be prevented by the action of the protective means if the functioning thereof were not blocked by the action of the current of cooling medium on the protective means. Upon disablement of the cooling medium supply means, accompanied by reduced flow or entire stoppage of flow of the cooling medium, the blocking effect of the current flow on the protective means is prevented and the protective means then functions to stop the heat losses in the apparatus or to stop the operation of the apparatus.

The specific means for control of the apparatus includes preferably a thermostatic switch means, a heatable element of which is continuously energized from an electric circuit but which by reason of its being mounted in the blower air blast is so cooled thereby that the thermostatic means cannot operate to cut off or otherwise modify the operation of the rectifier apparatus. Upon stoppage of the air blast for any reason, or reduction of the air blast below a predetermined limit, the cooling effect of the air blast disappears or diminishes thereby permitting the temperature of the continually energized heatable element to rise sufficiently to cause the thermostatic means to function as a control means to cut off the rectifier apparatus from the supply circuit or otherwise to prevent damage due to overheating of the apparatus.

Further, in accordance with my invention, in case the invention is applied to rectifying systems for charging storage batteries, a means is provided, operating independently of or in conjunction with the above-mentioned thermostatic means and associated preferably with the charging terminals through which the battery is connected to the rectifier apparatus, for preventing the connection of the alternating current supply circuit to the rectifier unless the storage battery is first connected to the rectifier circuit.

My invention will be better understood from the following description when considered in connection with the accompanying drawings, and its scope will be set forth in the appended claims.

Figure 2:
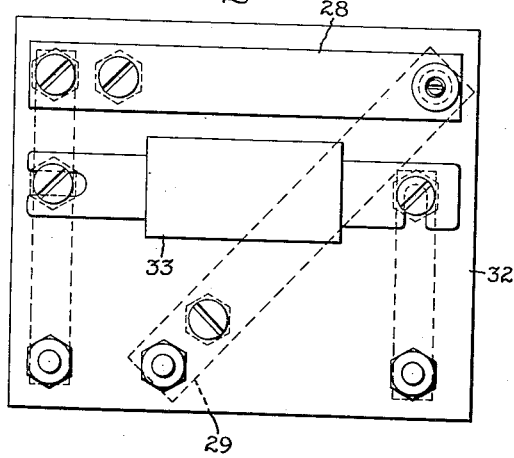
Figure 3:
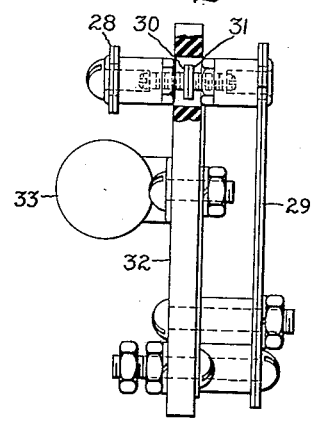
Figure 5:
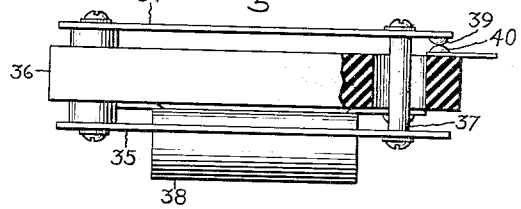
Figure 4:
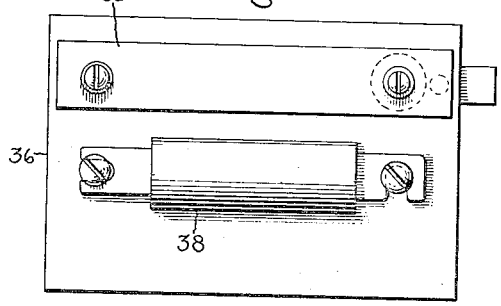
Figure 6:
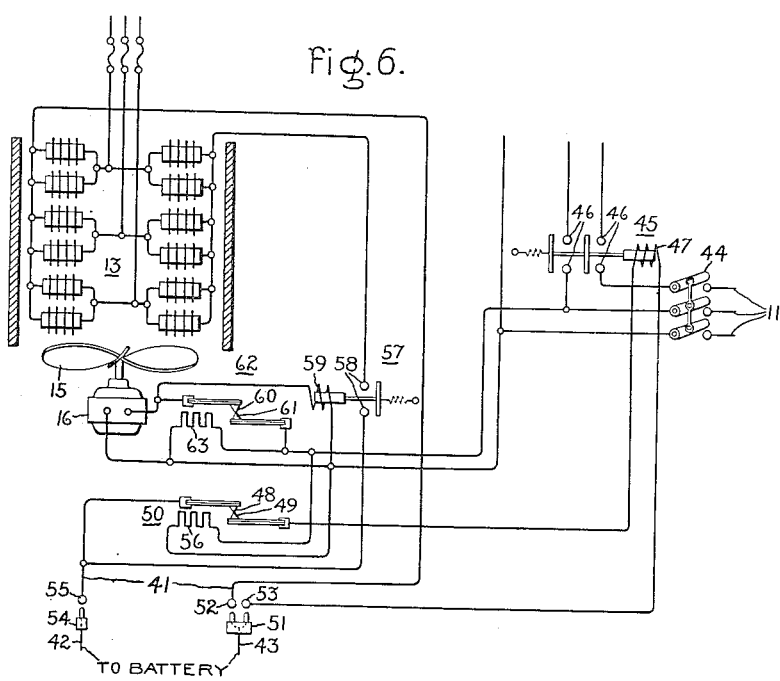
Figure 8:
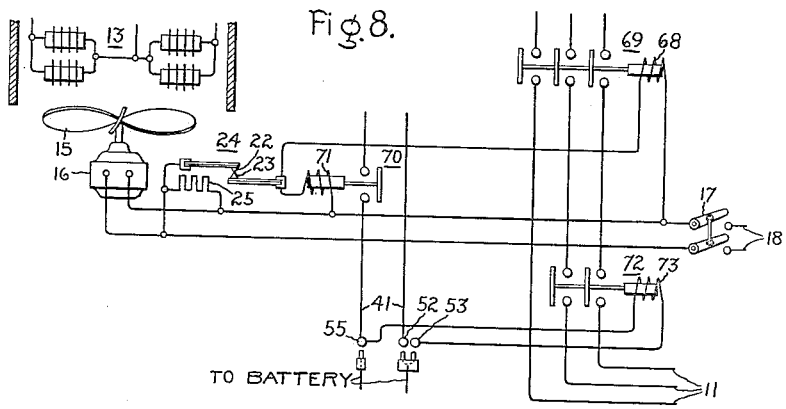
Figure 7:
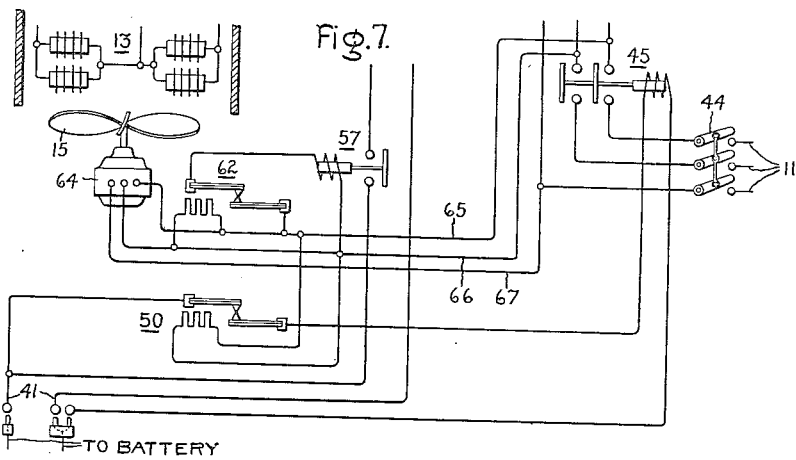
Figure 9:
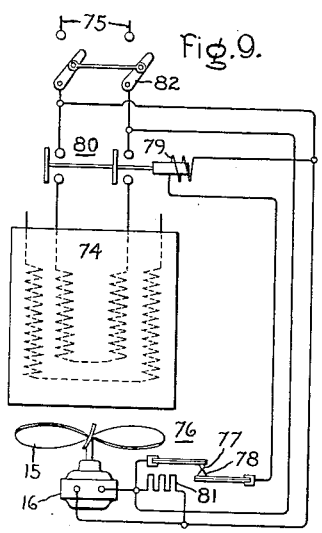

Referring to the drawings, Fig. 1 is a diagrammatic representation of a rectifier system for supplying direct current to a motion picture arc or like load from an alternating current circuit, in which my invention has been embodied; Figs. 2 and 3 are respectively a plan view and a side-elevational view of a thermostatic device which may be utilized in carrying the invention into effect; Figs. 4 and 5 are respectively a plan view and a side-elevational view of another thermostatic device which may be utilized in carrying the invention into effect; Figs. 6 and 7 are diagrammatic representations of rectifying systems for supplying charging current to a storage battery from an alternating current circuit, in which my invention has been embodied; Fig. 8 illustrates a rectifying system similar to that of Fig. 1 but arranged to supply current for charging storage batteries; and Fig. 9 illustrates diagrammatically an electric transformer system in which my invention has been embodied.

In Fig. 1, the numeral 10 designates a direct current circuit which may be connected to supply current to a motion picture arc or like load (not shown) from a three-phase alternating current circuit 11 through a transformer 12 and a rectifying apparatus 13 including a plurality of contact rectifier devices 14, preferably of the copper oxide type, and a blower means or fan 15 to direct an air blast on the rectifiers. The fan 15 is driven by a motor 16 connected directly through a line switch 17 to a control circuit 18 which, in case the rectifier apparatus is used to supply a motion picture arc, may be conveniently the alternating current sound system circuit. To connect the rectifier apparatus 13 through transformer 12 to the alternating current circuit 11, a switch means 19 is provided, in two of the phases of circuit 11, having operating windings 20 energized from the control circuit 18 through switch 17 to close the contacts 21 of the switch means 19.

To provide means for disconnecting the rectifier apparatus 13 from the supply circuit 11 in the event of disablement of the blower means, the operating windings 20 of switch means 19 are connected to control circuit 18 through normally closed contacts 22, 23 of a thermostatic switch means of unit 24 having a heater means 25 arranged to heat one of the elements as 26 of the contact carrying elements 26, 27. The heater 25 is arranged to be continually energized from control circuit 18 but is continually cooled during normal operation of the rectifier system, since the thermostatic switch unit 24 is so mounted as to be exposed to an air blast due to fan 15.

In the operation of the rectified system illustrated in Fig. 1, the switch means 19 and the thermostatic switch unit 24 being in their illustrated positions, upon closing of switch 17 contacts 21 of switch 19 are closed by current from control circuit 18 flowing in the operating windings 20 through contacts 22, 23, and motor 16 is started by current from circuit 18 to drive fan 15. Heater element 25 is at the time energized by current from circuit 18 and begins immediately to heat, thereby tending to transmit to the adjacent thermostatic switch element 26 sufficient heat to cause the latter to operate the contacts 22, 23 and thereby to deenergize relay windings 20 to operate contacts 21 of the alternating current line switch 19. But, since the fan 15 is now rotating, the air blast produced thereby prevents the thermostatic switch unit 24 from functioning, due to the cooling effect of the air blast on heater 25 and on the thermostatic switch blades. However, if upon closing of the switch 17 to connect the supply circuit 11 to the fan motor 16 and to the rectifier apparatus as above described, the fan 15 does not start to rotate within a predetermined time limit, for example from 1 to 2 minutes, the thermostatic switch unit 24 becomes heated sufficiently to open the contacts 22, 23 thereby disconnecting coils 20 from the circuit 18 which supplies these actuating coils of the line switch 19 causing the latter switch 19 to trip and to disconnect the alternating current supply line 11 from the rectifier apparatus. Further, if at any time during normal operation of the rectifier system the air blast from fan 15 fails or is reduced below a predetermined limit, from mechanical jamming of the fan, open circuiting or short-circuiting of the motor 16, failure of the control circuit 18, or from any cause whatsoever, the protective means including thermostatic switch unit 24 will function as above described to protect the rectifier devices 14 from overheating.

The thermostatic switch unit illustrated in Figs. 2 and 3 as suitable for the purposes of my invention comprises two coacting bimetallic thermostatic elements 28, 29 carrying coacting contacts 30, 31 at their free ends and mounted upon opposite sides of a supporting and insulating plate 32 upon which is mounted a heater element 33 closely adjacent the corresponding bimetallic thermostatic element 28 but separated from the other element, 29, by the plate. In Figs. 4 and 5 the thermostatic switch unit comprises two like metal elements or strips 34, 35 mounted on opposite sides of an insulating base plate 36 and rigidly connected at their free ends by a bar or post 37. A heater element 38 is mounted on the plate 36 closely adjacent one of the metal strips 35, but is separated by the plate from the other metal strip 34 which carries a contact 39 coacting with a fixed contact 40 mounted on the base 36. In operation of the thermostatic unit shown in Figs. 2 and 3 it will be understood that the device is of the type compensated for ambient temperature since the bimetallic elements 28 and 29 move simultaneously in the same direction under the influence of ambient temperature variation, and that upon sufficient heating of the element 28 by heater 33 the element 28 bends to open the contacts 30, 31. It will also be understood that the thermostatic switch element or unit shown in Figs. 4 and 5 is also compensated for ambient temperature variations since the like strips 34, 35 expand equally for a given temperature change, and that upon heating of strip 35 by heater 38 the strip 35 expands more than the other strip 34 causing the latter to bend and to open the contacts 39, 40.

In Fig. 6, the numeral 41 designates a direct current circuit adapted to be connected to a pair of cables 42, 43 for charging a storage battery (not shown) from the three-phase alternating current circuit 11 through a transformer (as shown in Fig. 1) and the blower-cooled rectifier apparatus 13 with which is associated the fan 15 and driving motor 16. In addition to a disconnecting switch 44, the alternating current supply circuit 11 in Fig. 6 is provided with a switch means 45 having contacts 46 in two or all of the phases of the alternating current line and an actuating winding 47 adapted to be connected to the direct current circuit 41 through the normally closed contacts 48, 49 of a thermostatic switch unit 50 and a two-prong plug 51 connected to one battery cable 43. The plug 51 coacts with sockets 52, 53 connected respectively to one side of circuit 41 and to one side of winding 47, the other cable plug 54 coacting with a socket 55 connected to the other side of circuit 41. The thermostatic switch unit 50 includes heater means 56 adapted during operation of the system to be continually energized from the alternating current circuit 11. The direct current circuit 41 is provided with a switch means 57 having contacts 58 adapted to be closed by an actuating winding 59 which is connected across a phase of alternating current circuit 11 through normally closed contacts 60, 61 of a thermostatic switch unit 62 having a heater means 63 continually energized during operation of the system from a phase of alternating current circuit 11. Motor 16 is also connected to one phase of alternating current circuit 11 through the contacts 60, 61 of thermostatic switch unit 62. The thermostatic switch units 50 and 62 are arranged in the same manner as switch unit 24 in Fig. 1 with reference to the air blast produced by fan 15.

In operation of the system shown in Fig. 6, switch means 45, 50, 57 and 62 being in their illustrated positions, upon insertion of plug 54 in socket 55 and of plug 51 in sockets 52, 53 switch 45 is closed by battery current through contacts 48, 49 of thermostatic unit 50, assuming a residual charge in the battery sufficient to actuate winding 47. Upon closing of the alternating current line switch 44, switch 57 is closed by current from alternating current circuit 11 and motor 16 is started. Heater elements 56 and 63 at the same time begin immediately to heat, thereby tending to cause thermostatic units 50 and 62 respectively to disconnect the alternating current circuit 11 and the direct current circuit 41 from the rectifier system 13. Functioning of the thermostatic switch units 50 and 62 is, however, prevented by the action of the air blast produced by fan 15, in the same manner as above explained in connection with the operation of the system shown in Fig. 1. If plugs 51 and 54 are not in place in operative position to connect the storage battery to direct current circuit 41, switch 45 is not closed and no current is supplied from alternating current circuit 11 to operate the rectifier apparatus 13. If, after closing of alternating current line switch 44 the fan 15 does not start, the thermostatic devices heat up and cut off both the alternating current circuit 11 and the direct current circuit 41 from the rectifier.

In the embodiment of the invention shown in Fig. 6, therefore, the rectifier apparatus is prevented from operating unless the battery is connected to the direct current circuit terminals; the rectifier apparatus is prevented from being connected to the battery in case the alternating current circuit fails; and by means of the thermostatic units 50 and 62 both alternating current circuit 11 and direct current circuit 41 are opened in case of disablement of the fan 15 or stoppage of the air blast from any cause.

In Fig. 7 the system is similar in construction and mode of operation to the system above described in connection with Fig. 6 except that in Fig. 7 a three-phase motor 64 for driving the cooling fan 15 is provided adapted to be connected through leads 65, 66 and 67 to the alternating current circuit 11. If the battery load is not connected to direct current circuit 41 switch 45 remains open to disconnect the supply circuit 11 from the rectifier apparatus 13. Assuming, however, the battery load to be properly connected and switch 45 thereby closed, upon closing of alternating current line switch 44 current from all of the phases of circuit 11 operates the motor 16 to rotate fan 15, and voltage across one phase of circuit 11 closes switch 57 to connect the rectifier apparatus 13 to the battery. Upon failure of the alternating current line 11 the direct current circuit switch 57 opens to disconnect the battery from the rectifier apparatus, and upon stoppage of the air blast the thermostatic units 50, 62 operate to open alternating current circuit 11 and direct current circuit 41, at the switches 45 and 57.

In Fig. 8, showing a battery charging system, the circuit arrangements are similar to those of the system shown in Fig. 1 for supplying a motion picture arc or similar load, in that in Fig. 8 the fan motor 16 and the heater 25 of the thermostatic unit 24 are supplied with current directly from the control circuit 18 through the switch 17, and an actuating winding 68 of a switch 69 in the alternating current supply circuit 11 is energized from the control circuit 18 through switch 17 and the contacts 22, 23 of the thermostatic unit. The system of Fig. 8, however, distinguishes from that of Fig. 1 by further including a switch 70 for the direct current circuit 41 having an actuating winding 71 which also is supplied with current from control circuit 18 through switch 17 and the contacts 22, 23 of thermostatic unit 24, and in addition a second switch 72 in the alternating current circuit 11 having an actuating winding 73 adapted to be supplied with direct current upon connection of a storage battery to the direct current circuit terminals 52, 53 and 55, in the manner explained in connection with Fig. 6.

In operation of the system shown in Fig. 8, assuming a battery to be connected to the direct current circuit 41 and switch 17 to be closed, switches 69 and 70 are then closed by current from control circuit 18, and switch 72 is closed by current from direct current circuit 41 which is connected to the battery. Operating current is thereupon supplied to rectifier apparatus 13 from circuit 11. If, however, the battery is not connected to direct current circuit 41 the rectifier apparatus 13 cannot be operated on open circuit since switch 72 opens to disconnect the rectifier apparatus from the supply circuit 11. If, further, the air blast provided by fan 15 stops from any cause the rectifier apparatus cannot be operated, since the thermostatic unit 24 then operates to disconnect the actuating windings 68 and 71 from the control circuit 18, thereby disconnecting supply circuit 11 from rectifier apparatus at switch 69 and disconnecting direct current circuit 41 from the rectifier apparatus at switch 70.

In Fig. 9, the numeral 74 designates an electric transformer connected to an alternating current supply circuit 75 and adapted to be cooled by the fan 15 actuated by the motor 16 which is supplied with current from the alternating current circuit. To protect the transformer from damage due to overheating, a thermostatic unit 76, similar to thermostatic unit 24 of Fig. 1 for example, is provided having normally closed contacts 77, 78 in series with the actuating winding 79 of a switch 80 between the alternating current line 75 and the transformer. The thermostatic unit 76 includes a heater element 81 continually energized from the alternating current circuit as long as the line switch 82 is closed. The actuating winding 79 of switch 80 is normally connected across the alternating current circuit 75 through the thermostatic unit 76. In operation, assuming line switch 82 closed, as long as the air blast from the fan 15 maintains heater 81 in cooled condition, switch 80 is held closed to connect the transformer to the supply circuit. But in the event of stoppage of the air blast from any cause, the thermostatic unit 76 functions to deenergize switch 80 and thereby disconnect the transformer from the supply circuit, in the same manner as above described for example in connection with the thermostatic unit 24 of Fig. 1.

Instead of separate heater means for the thermostatic switch units described in connection with the foregoing embodiments of my invention, other means to cause functioning of the thermostatic units may be employed, such for example as the heating of a thermostatic switch bar by direct current flow of energizing current therethrough. Any other suitable thermostatic switch means may be employed than those hereinabove described, preferably of the type compensated for ambient temperature, provided that the protective means is controlled, in accordance with my invention, in response to the current of cooling medium.

It will be noted that the thermostatic switch means which I employ as protective devices for apparatus subject to damage from overheating are not so arranged as to operate only after the rise of temperature in the apparatus has become objectionable or dangerous, as would be the case if the operation of the thermostatic unit depended on a direct rise of heat from the apparatus to be protected. In the prior protective arrangements when used, for example, with rectifiers it was necessary to wait until the copper oxide rectifier washers were actually heated and in damaged condition before the supply circuit was opened. In accordance with my present invention, however, it is not necessary to wait, before operating the thermostatic protective means, until the rectifier apparatus is hot. On the contrary the operation of the protective means is timed by the stoppage of the air blast from the fan, since the thermostatic unit is continually energized by heating current but is cooled sufficiently to prevent its functioning except, after a predetermined short period of time, in the event that the air blast stops.

In those embodiments of my invention in which a load such as a storage battery or a motion picture arc is supplied with direct current through a fan-cooled copper oxide or other rectifier, the alternating current supply circuit has been illustrated as three-phase, and in the embodiment including a fan-cooled power transformer the supply circuit has been illustrated as single-phase. It will be understood, however, that the invention is not to be limited to apparatus including particular types of alternating current supply circuits, but that single-phase or any suitable polyphase supply circuits may be utilized in the various embodiments of the invention.

My invention has been described herein in particular embodiments for purposes of illustration. It is to be understood however that the invention is susceptible of various changes and modifications and that by the appended claims I intend to cover any such modifications as fall within the true spirit and scope of my invention.

What I claim as new and desire to secure by Letters Patent of the United States is:

1. In combination, an apparatus characterized by the development of heat losses in operation, means to supply a current of cooling medium to said apparatus to remove said losses, thermostatic means, heating means for said thermostatic means, and means to energize said heating means continuously during operation of said apparatus, said thermostatic heating means being sufficiently cooled by said current to maintain operation of said apparatus during normal operation of the cooling medium supply means and said thermostatic heating means becoming sufficiently heated upon disablement of said cooling medium supply means to stop said development of heat losses.

2. In combination, an apparatus characterized by the development of heat losses in operation, means to supply a current of cooling medium to said apparatus to remove said losses, thermostatic means, heater means for said thermostatic means, means to energize said heater means continuously during operation of said apparatus, means including said cooling medium supply means to cool said heater means and thereby to maintain operation of said apparatus during normal operation of said cooling medium supply means, and means operative upon disablement of said cooling medium supply means and upon the consequent rise in temperature of said heater means to stop said development of heat losses.

3. In combination, an apparatus subject to overheating in operation, means to supply a blast of cooling air to said apparatus to prevent the overheating, and a thermostatic switch means to control the operation of said apparatus, said switch means having a normally electrically energized heater means mounted in said air blast, said heater means being adapted to be cooled sufficiently during normal operation of the air supply means to cause said thermostatic switch means to maintain operation of said apparatus, said heater means being adapted to become heated sufficiently upon disablement of the air supply means to operate said thermostatic switch means to stop operation of said apparatus.

4. In combination, a power rectifier apparatus including a rectifier having a blower means to prevent rise of temperature of said rectifier above a predetermined limit, a thermostatic switch means for controlling the operation of said rectifier, means for supplying heat continuously to said switch means during operation of said apparatus, said switch means being adapted to be cooled by the blower means, said switch means being so arranged as to cause operation of said rectifier during normal operation of the blower means and to stop operation of said rectifier upon disablement of the blower means.

5. In combination, a rectifier apparatus including a rectifier and a cooling fan associated therewith to permit relatively high current flow through said rectifier without a temperature rise therein above a predetermined limit, a thermostatic switch means compensated for ambient temperature variations for controlling the operation of said rectifier, means for supplying heat continuously to said switch means during operation of said apparatus, the thermostatic switch means being so mounted with respect to the fan as to be cooled by air therefrom and being so arranged that said current is caused to flow in said rectifier during normal operation of said fan and that said current flow is stopped upon stoppage of said fan.

6. In an electric apparatus for supplying power to a direct current circuit from an alternating current circuit, said apparatus comprising a rectifier and a blower to supply cooling air thereto, a switch means between said rectifier and said alternating current circuit, a control circuit, a motor supplied with current from said control circuit to actuate said blower, a thermostatic device to cause current from said control circuit to operate said switch means, means for supplying heat continuously to said thermostatic device during operation of said apparatus, said thermostatic device being adapted to be cooled by cooling air from said blower and being so arranged that said switch means is closed to connect said rectifier to said alternating current circuit during normal flow of cooling air from the blower and that said switch means is opened upon stoppage of the blower cooling air.

7. In an electric apparatus for supplying power to a direct current load circuit from an alternating current circuit, said apparatus comprising a rectifier and a blower to supply cooling air thereto, a pair of terminals for the direct current circuit, a switch means between the rectifier and the alternating current circuit, a second switch means between the rectifier and at least one of said terminals, a motor supplied with current from the alternating current circuit to actuate said blower, and two thermostatic devices arranged respectively to control the operation of said first-named and said second-named switch means, said thermostatic devices being adapted to be cooled by cooling air from said blower and being so arranged that both of said switch means are closed to connect the rectifier to the alternating current circuit and to said direct current circuit terminals during normal flow of cooling air from the blower and that both of said switch means are opened upon stoppage of the cooling air.

8. In an electric apparatus for supplying power to a direct current load circuit from an alternating current circuit, said apparatus comprising a rectifier and a blower to supply cooling air thereto, a pair of terminals for said direct current load circuit, a switch means between the rectifier and the alternating current circuit adapted to be operated by current from the direct current circuit, means associated with said terminals to prevent flow of operating current for said switch means until the load circuit is connected to said terminals, a second switch means between the rectifier and at least one of said terminals, a motor supplied with current from the alternating current circuit to actuate said blower, and two thermostatic devices arranged respectively to control the operation of said first-named and said second-named switch means and each having a heater element adapted to be cooled by cooling air from the blower, said thermostatic devices being so arranged that both of said switch means are closed to connect the rectifier to the alternating current circuit and to said direct current circuit terminals during normal flow of cooling air from the blower and that both of said switch means are opened upon stoppage of the cooling air.

9. In a rectifying apparatus for charging a storage battery from an alternating current circuit, said apparatus comprising a rectifier and a blower to supply cooling air thereto, charging terminals adapted to be connected to the battery, a switch means in series between the rectifier and the alternating current circuit, circuit connections between said terminals and said switch means to supply operating current to said switch means, means associated with said terminals to prevent flow of operating current for said switch means until the battery is connected to said terminals, a second switch means between the rectifier and at least one of the terminals, a motor supplied with current from the alternating current circuit to actuate the blower, and two thermostatic devices arranged respectively to control the operation of said first-named and said second-named switch means and each having a heater element adapted to be cooled by cooling air from the blower, said thermostatic devices being so arranged that both of said switch means are closed to connect the rectifier to the alternating current circuit and to said direct current circuit terminals during normal flow of cooling air from the blower and that both of said switch means are opened upon stoppage of the cooling air.

10. In an electric apparatus for supplying power to a direct current load circuit from an alternating current circuit, said apparatus comprising a rectifier and a blower to supply cooling air thereto, a pair of terminals for the direct current load circuit, two switch means in series between the rectifier and the alternating current circuit, one of said switch means being adapted to be operated by current from the direct current load circuit, means associated with said terminals to prevent flow of operating current for said one of the switch means until the direct current load circuit is connected to said terminals, a control circuit, a motor supplied with current from said control circuit to actuate said blower, and a thermostatic device arranged to control the flow of operating current from the control circuit to the other of said switch means, said device having a heater means continually supplied with current from the control circuit and adapted to be cooled by said cooling air, said thermostatic device being so arranged that said other of said switch means is closed to connect the rectifier to the alternating current circuit during normal flow of said cooling air from said blower and that said other of the switch means is opened upon stoppage of the cooling air.

11. In a rectifying apparatus for charging a storage battery from an alternating current circuit, said apparatus comprising a rectifier and a blower to supply cooling air thereto, charging terminals adapted to be connected to the battery, two switch means in series between the rectifier and the alternating current circuit, circuit connections between said terminals and one of said switch means to supply operating current thereto, means associated with said terminals to prevent flow of operating current to one of said switch means until the battery is connected to said terminals, a control circuit, a motor supplied with current from said control circuit to actuate said blower, and a thermostatic device arranged to control the flow of operating current from the control circuit to the other of said switch means, said device having a heater means continually supplied with current from the control circuit and adapted to be cooled by cooling air from said blower, said thermostatic device being so arranged that said other of said switch means is closed to connect the rectifier to the alternating current circuit during normal flow of cooling air from said blower and that said other of the switch means is opened upon stoppage of the cooling air.

EDGAR A. HARTY.